May 31, 1932.                C. D. BARKER                1,860,979
                      ELECTRICAL DISPLAY DEVICE
                     Filed March 5, 1931       2 Sheets-Sheet 1

Inventor
Charles D. Barker
By his Attorney

May 31, 1932.  C. D. BARKER  1,860,979
ELECTRICAL DISPLAY DEVICE
Filed March 5, 1931   2 Sheets-Sheet 2
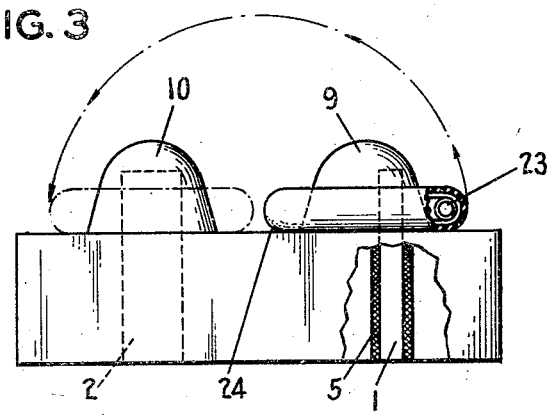
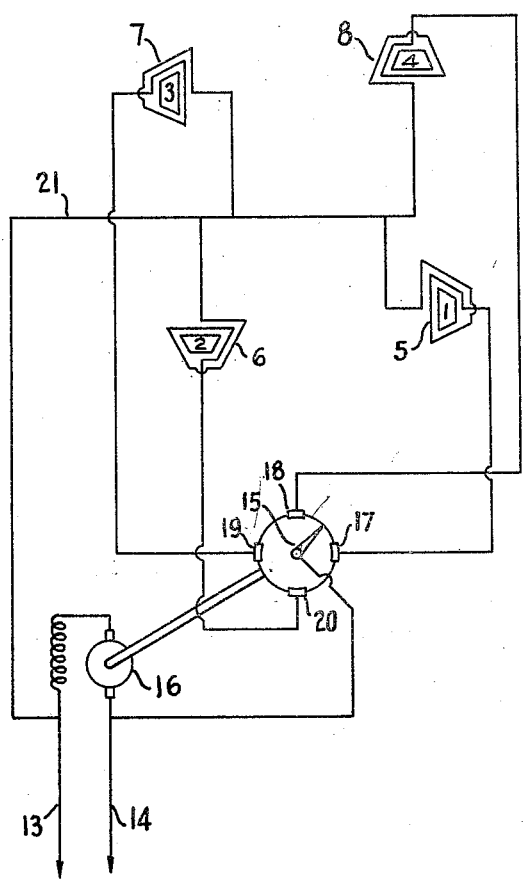
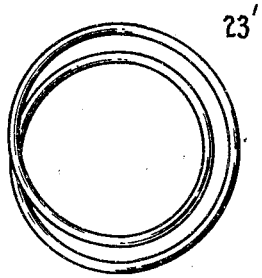
Inventor
Charles D. Barker
By his Attorney Patented May 31, 1932

1,860,979

UNITED STATES PATENT OFFICE

CHARLES D. BARKER, OF JACKSON, MICHIGAN, ASSIGNOR TO IRA J. ADAMS, OF NEW YORK, N. Y.

ELECTRICAL DISPLAY DEVICE

Application filed March 5, 1931. Serial No. 520,245.

This invention relates to advertising devices for use in shop windows, stores and other places where it is desirable to attract a crowd of people.

One object of the invention is to construct an advertising or display device in such a way that an object of common usage, such as an automobile tire for example, may be caused to flop from one of its sides to the other in a definite track without any apparent reason.

Another object of the invention is to construct a device as a closed secondary of a transformer and adapt it to pass by magnetic repulsion in progression over a plurality of primary coils, the coils being hidden from view so as not to disclose the continued movement of the device.

Another object of the invention is to so arrange the device that a coil acting as a secondary of the transformer therein is adapted to fit over the magnetic core of the primary of the transformer in such a way that the mutual repulsion of the two coils shall be eccentric of the device.

Other objects will appear in the appended description, reference being had to the drawings in which:

Fig. 3 is an elevation of the arrangement shown in Fig. 2.

Fig. 4 is a wiring diagram showing how the primaries of the transformers are progressively energized.

Fig. 5 illustrates another form of secondary coil closed on itself and adapted to be inserted in the automobile tire or other device to be moved in progression over the cores of the transformer.

The invention can be used in various ways for propelling various types of devices but for illustrative purposes I have disclosed a system for rotating an automobile tire about its rim in a direction that is parallel to the axis of the tire. This tire could be caused to travel in any desired course but by way of example, I have shown it adapted to rotate or flop successively over four transformer coils made in the form of a rectangle shown particularly in Figs. 1 and 2.

It is well known that there is a mutual repulsion between the primary and secondary coils of the transformer and I use this force to produce the puzzling movements of the automobile tire or other device. The transformer in the system shown in Fig. 2 consists of four cores 1, 2, 3 and 4, and around these cores is arranged primary coils 5, 6, 7 and 8. Fig. 3 has been partially broken away to show the location of the transformer cores on the primary coil.

In order to produce the desired turning moment, pilot cones 9, 10, 11 and 12 are placed over the transformer cores and located eccentric thereto. These cones may be made of any material but preferably should be of non-conducting and non-magnetic material. Glass, porcelain or wood are examples of material that may be advantageously used. These pilot cones have a base portion that is somewhat smaller than the tire or other device to be used. Inside the tire or similar device, and concealed from view, is placed a conducting coil 23 closed on itself to form a closed secondary of the transformer. This coil may be wound to assume the shape of the usual coil spring as shown in the broken away portion of Figs. 2 and 3, or it may consist of one or more convolutions of conducting material 23' such as is shown in Fig. 5.

Figure 2:
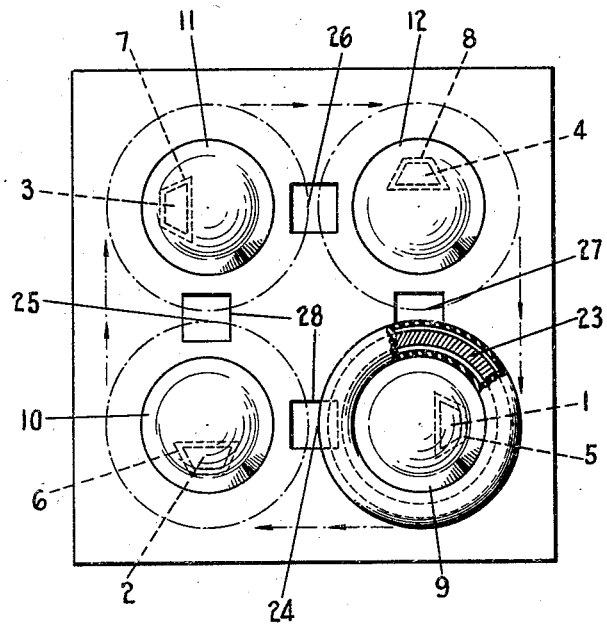
Fig. 2 is a diagrammatic plan view of the arrangement of the magnetic cores, the automobile tire being shown partly in section to show the internal coil arrangement.

In order to place the core of the transformer as far away from the center of the axis of the tire as desirous, the core may take the form of a trapezoid in cross section as shown clearly in Fig. 2. In order to progressively rotate or flop the tire continually in regular succession over the transformer cores they are arranged off-center so that the reaction between the primary and secondary coils will throw the tire in a continuous direction clockwise, as shown in Fig. 2, from one core to another.

In Fig. 4 I have illustrated a wiring diagram of the circuits that may be employed. In this figure 13, 14 indicate the mains which may be the ordinary house lighting alternating current supply or it may be direct current properly interrupted to give it a pulsating or alternating form by means not shown. The contact arm 15 shown diagrammatically is rotated by any device such as clockwork or by an electric motor 16 so as to progressively contact with points 17, 18, 19 and 20. Each of the coils 5, 6, 7 and 8 is connected to have a common return 21 connected to one of the supply lines such as 13 and the other ends of the coils are respectively connected to contacts 17 to 20 inclusive.

The operation of the device is as follows: When the contact arm 15 engages with contact 17, coil 5 is energized. This induces alternating current in the short-circuited secondary 23 and the direction of the currents in the two coils is such that there is mutual repulsion. Coil 5 being held stationary, coil 23 tends to move off of the core of the transformer. Since the coil and transformer are located eccentric to the core, as shown in Fig. 2, this repulsive movement tilts the tire about point 24. The sudden repulsion force kicks the coil and tire sufficiently to throw the tire past the vertical position after which it will fall onto pilot 10 over the core 2. Core 2 is next energized by the contact arm 15 engaging contact 18. This repulses the tire and tilts it about the point 25 due to the location of the core 2 in the off-center position. The tire then falls over the core 3. The closure of contacts 15, 19 then tilts the tire about the point 26 and it falls over core 4. Closure of contacts 15, 20 then energizes core 4 and tilts the tire about point 27 which deposits the tire back in the original position and the journey of the tire around the rectangle is repeated.

Figure 1:
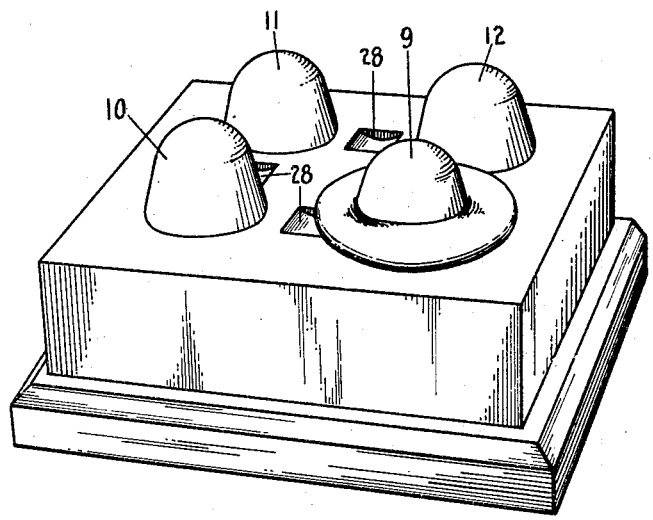
Fig. 1 is a perspective view of one form of the display device with all electrical parts concealed from view.

By constructing the device as shown in Fig. 1 the peculiar movements of the tire are quite baffling to the average person and the mystery will attract large crowds to view the device.

When round devices such as tires are used it is advisable to have slots or cavities such as 28 between all of the pilots so as to provide spaced supports for the round device and cause it to tilt in the desired direction. If these slots, or some similar arrangement, are not provided the tire is likely to veer off to one side and eventually to miss one of the pilots.

The operation will be the same when the secondary consists of one or more convolutions such as shown in Fig. 5. Practically the only difference between the circular coil of Fig. 5 and that shown in Fig. 2, as far as operation is concerned, is that the circular coil of Fig. 2 would have higher self-induction. Either of these coils may be made of heavy wire or may be made to have any desired resistance by choice of conducting material or by cross section or length of the conductor.

It will be apparent that the invention may be employed to move the tire in any given course other than the one shown in Fig. 2 and the invention is not to be limited to any particular line of travel of the device.

It will be apparent that various other modifications may be made without departing from the spirit of the invention.

Having described my invention, what I claim is:

1. In display devices, a primary coil, a device to be moved thereby, a closed secondary coil attached to said device positioned eccentric to the primary coil, and means to energize said primary coil to repel the device and attached secondary coil outside the influence of the primary coil.

2. In display devices, a primary coil, a base adjacent said coil, a device resting on said base, a closed secondary coil attached to said device positioned eccentric to the primary coil, and means to energize said primary coil to repel the secondary coil outside the influence of the primary coil and tilt the device about a point in said base.

3. In display devices, a primary coil, a device to be moved thereby, a pilot to position said device eccentric to said primary coil, a closed secondary coil attached to said device, and means to energize said primary coil to repel the secondary coil and device outside the region of influence of said primary coil.

4. In display devices, a plurality of separate primary coils, a device to be moved thereby, a closed secondary coil attached to said device, pilots adapted to position said secondary coil eccentrically over said primary coils, and means to energize said primary coils in succession to repel the secondary coil and position the device in succession over said pilots.

5. In display devices, a plurality of separate primary coils equally spaced on a given circle, a device to be moved thereby, a closed secondary coil attached to said device, means to position said device with the secondary eccentric to said primary coils, and means to successively energize said primary coils to tilt the device over the primary coils in succession.

6. In display devices, a plurality of equally spaced primary coils, a device to be moved, a closed secondary coil attached to said device, pilots to position the secondary coil eccentric to the primary coil and means to energize the primary coils in succession to move the device in succession over said primary coils.

7. In display devices, a plurality of primary coils equally spaced, an automobile tire, a closed secondary coil in said tire, a conical pilot positioned over each of said primary coils, eccentric thereto on a line connecting the center of a cone with the succeeding cone, and means for intermittently energizing said primary coils in succession to turn said tire in succession over said cones.

8. In a display device, a plurality of primary coils equally spaced around a circle, a conical pilot positioned over each of said primary coils eccentric thereto on a line connecting the center of a cone with the succeeding cone and means for intermittently energizing said primary coils in succession to turn said tire over said pilots continuously around said circle.

9. In display devices, a coil adapted to produce a field, a base adjacent said coil, a device adjacent said base, a second coil attached to said device and adapted to produce a field, the central axis of which lies outside the central axis of the field of the first coil, and means to energize the first coil to induce currents in the second coil and tilt the device over said base.

In testimony whereof I have signed my name to this specification this 29th day of January, 1931.

CHARLES D. BARKER.